(12) United States Patent
Phillips (10) Patent No.: US 11,746,595 B2
(45) Date of Patent: Sep. 5, 2023

(54) FENCE OPENING APPARATUS

(71) Applicant: RentACoop LLC, Germantown, MD (US)

(72) Inventor: Tyler Phillips, Germantown, MD (US)

(73) Assignee: RentaCoop LLC, Germantown, MD (US)

( * ) Notice: Subject to any disclaimer, the term of this patent is extended or adjusted under 35 U.S.C. 154(b) by 216 days.

(21) Appl. No.: 17/194,193

(22) Filed: Mar. 5, 2021

(65) Prior Publication Data

US 2022/0282569 A1 Sep. 8, 2022

(51) Int. Cl.
*E06B 11/02* (2006.01)
*E04H 17/08* (2006.01)

(52) U.S. Cl.
CPC ............ *E06B 11/021* (2013.01); *E04H 17/08* (2013.01)

(58) Field of Classification Search
CPC ... E04H 12/22; E04H 12/2215; E04H 12/223; E04H 12/2238; E04H 12/2253; E04H 12/2269; E04H 17/009; E04H 17/017; E04H 17/08; E04H 17/20; E04H 17/22; E04H 17/23; E04H 17/261; E04H 17/263; E04H 17/265; E06B 11/00; E06B 11/021; E06B 11/028; H01B 17/145
See application file for complete search history.

(56) References Cited

U.S. PATENT DOCUMENTS

| | | | | |
|---|---|---|---|---|
| 1,570,734 A | * | 1/1926 | Eversman | E06B 11/021 49/374 |
| 1,574,688 A | * | 2/1926 | Plummer | E06B 11/021 292/113 |
| 1,584,585 A | * | 5/1926 | Woods | E06B 11/021 292/247 |
| 4,174,096 A | | 11/1979 | Campbell | |
| 5,088,680 A | * | 2/1992 | Farmer | E01F 9/692 248/910 |
| 5,813,662 A | * | 9/1998 | Langkruis | E04H 12/2246 256/25 |
| 6,041,486 A | | 3/2000 | Forbis | |
| 6,202,987 B1 | | 3/2001 | Forbis | |
| 6,585,234 B2 | | 7/2003 | Berto | |
| D554,478 S | * | 11/2007 | Robinson | D8/356 |

(Continued)

FOREIGN PATENT DOCUMENTS

| KR | 20110011546 U | * | 12/2011 | |
|---|---|---|---|---|
| NL | 9401555 A | * | 5/1996 | E01F 13/022 |

*Primary Examiner* — Jonathan P Masinick
(74) *Attorney, Agent, or Firm* — Kanika Radhakrishnan; Evergreen Valley Law Group (57) ABSTRACT

The present invention relates to a fence opening installation apparatus for connecting a pair of spaced fence posts, comprising: a latch member, at least two anchor members, at least one base member, wherein the latch member is releasably connected together between two spaced sections of a first fence post and a second fence post, wherein the first anchor member is disposed at the end of the first fence and the second anchor member is disposed at the end of a second fence post, and wherein the first and second fence post are operatively connected to the corresponding anchor members to disengage from the base member to raise out the corresponding post lower section of the fence post in conjunction with the user manipulation to create an opening for the user.

10 Claims, 10 Drawing Sheets

(56) References Cited

U.S. PATENT DOCUMENTS

| | | | |
|---|---|---|---|
| 7,631,409 B2* | 12/2009 | Dehlsen | E04H 17/22 |
| | | | 29/527.1 |
| 8,579,262 B2* | 11/2013 | Sadinsky | E04H 17/22 |
| | | | 256/26 |
| 8,925,904 B2* | 1/2015 | Christoffer | E04G 21/3223 |
| | | | 182/113 |
| 9,464,452 B2* | 10/2016 | Higgs | E04G 21/3238 |
| 10,202,804 B2 | 2/2019 | Prasad | |
| 10,329,793 B2* | 6/2019 | Nelson | E04H 17/08 |
| 2007/0252125 A1* | 11/2007 | Thompson | E04H 12/2238 |
| | | | 256/24 |
| 2013/0009121 A1 | 1/2013 | Xu | |
| 2014/0145046 A1* | 5/2014 | Layne | E04H 17/22 |
| | | | 248/188.1 |
| 2016/0362907 A1* | 12/2016 | Pinneri | E04H 17/08 |
| 2018/0258656 A1* | 9/2018 | Smith | E04G 21/3228 |
| 2019/0226232 A1* | 7/2019 | Goodin | E01F 13/02 |
| 2020/0392753 A1* | 12/2020 | Lomax | E04H 12/2238 |
| 2022/0064985 A1* | 3/2022 | Muc | E01F 9/692 |

\* cited by examiner

FENCE OPENING APPARATUS

TECHNICAL FIELD

This invention relates to a fence opening apparatus, particularly to a mechanism for transforming the opening between fences as a fence opening.

BACKGROUND OF THE INVENTION

Electric fences have long been in use to keep animals, particularly domestic farm animals such as cattle, within certain areas, such as pastures, or outside of crop-producing lands. Such electrified fences are ordinarily arranged by stringing a bare electrical wire around the perimeter of the area and mounting the wire on insulators secured to the posts. An electrical power source is connected between the wire and the ground so that any electrically conductive object, such as an animal, coming in contact simultaneously with both the wire and the ground will receive an electrical shock, usually, one of sufficient magnitude to be painful, but not strong enough to cause an injury.

Electrified fencing of the type described is advantageous in fencing long boundaries, customarily a single wire placed at a judicious height will normally suffice as an effective barrier.

Nonetheless, it is necessary to have passageways through the fence for authorized persons, such as farm personnel. Thus, if a conventional rigid hinged fence gate is employed, to allow access through the fence, care must be taken to provide adequate electrical contacts on the gate and on the fence so that the electrical continuity of the fence will be preserved when the gate is closed. Such a fence gate understandably becomes cumbersome and expensive. Moreover, access may be desired across the boundary at a plurality of points rather than a single point, thereby making the cost of conventional rigid swinging gates, particularly those equipped with suitable releasable electrical connectors, prohibitively expensive.

However, prior devices of facilitating passageways between electrical fences have not been fully satisfactory. For example, certain prior devices of this type have been unduly complex in construction, hence, expensive. Other related devices have been difficult to operate, requiring the use of both hands of the operator or substantial strength. Moreover, some prior devices have often been of relatively fragile construction and, thus, frequently require repair or replacement. Such devices further have often been of a character to subject the user, particularly if not careful, to an electrical shock, either by reason of the lack of proper insulation, or due to the relationship of the manually grippable portion thereof with the electrically conductive portions. Such devices further have often become unreliable, particularly after a substantial number of cycles of use under long periods of exposure to adverse weather conditions.

Thus, there is a need for a system and apparatus which can be easily and quickly installed to an existing fencing system by an individual without any particular specialized training or skill and provides a quick and safe passageway.

SUMMARY OF THE INVENTION

The present invention relates to providing a mechanism for transforming the opening between fences for selective opening and closing of an electrical fence with easy user operation.

The present invention relates to a fence opening installation apparatus for connecting a pair of spaced fence posts, comprising: a latch member, at least two anchor members, at least one base member, wherein the latch member is releasably connected together between two spaced sections of a first fence post and a second fence post, wherein the first anchor member is disposed at the end of the first fence and the second anchor member is disposed at the end of a second fence post, and wherein the first and second fence post are operatively connected to the corresponding anchor members to disengage from the base member to raise out the corresponding post lower section of the fence post in conjunction with the user manipulation to create an opening for the user.

Further, the present invention relates to a fence opening installation system for connecting a pair of spaced fence posts, comprising: a latch member, at least two anchor members, at least one base member, wherein the latch member is releasably connected together between two spaced sections of a first fence post and a second fence post, wherein the first anchor member is disposed at the end of the first fence and the second anchor member is disposed at the end of a second fence post, and wherein the first and second fence post are operatively connected to the corresponding anchor members to disengage from the base member to raise out the corresponding post lower section of the fence post in conjunction with the user manipulation to create an opening for the user.

Further, according to an embodiment, the latching member is an interlocked handle assembly providing both, a physical and an electrical opening in an electrified fence and, more specifically, releasably connects together two spaced sections of an electrical fence wire.

An interlocked handle assembly incorporates two handles interlocked as described. A first piece includes a handle and a first interlock portion and a second piece includes a handle and a second interlock portion. The two handles are oppositely joined by engaging the first and the second elongated walls through fasteners such as, screws, nails and the like, fastened in the depressions present at the inner walls of the handle.

The two handles, further, include mating portions for engagement of the interlock portions and also include one or more mating components disposed for preventing the first piece and second piece from becoming disengaged during operation. The interlock portion may be configured to be the point of contact between the two handles and thus, also the point where force is transferred between the mating components and the handle portions.

Further, the two separate handles are detachably locked at the interlock position by pulling or sliding the mating components between the interlocking portions such that the mating components cannot be pulled anymore. The handle component and the mating components may appear to be substantially perpendicular or orthogonal to one another. The mating components, for example, are hooks.

The handle component includes a first mating component, with its first end securely latched to one fence end post and the second end extends outwards to hook-on or latch-on to the other fence end post. The first mating component may be placed at the proximal end of the handle assembly.

Further, the handle component includes a seconding mating component, with its first end slidably connected to the handle component and the second end extends outwards to hook-on or latch-on to the other fence end post creating a secure pathway for manipulation by the user through the electric fence by grasping the handle grip portion of the handle assembly. The first mating component may be placed at the distal end of the handle assembly.

Other objects and purposes of this invention will be apparent to persons acquainted with apparatus of this general type upon reading the following specification and inspecting the accompanying drawings.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

FIGS. 1-4, illustrates a fencing system with the fence opening apparatus 10 installed. The fence opening apparatus 10 is utilized to be connected to a ground support surface and is placed between a fencing section connected to at least one fence end post 12,14 to selectively open and close as per user manipulation, creating a pathway between the spaced fence end posts 12, 14.

In this embodiment, the fence section exists either as one continuous fence, or a fence with two fence end posts, as is well known in the art. The fence opening apparatus 10 may be used with any types of fence posts such as round or square wooden posts. The fence opening apparatus 10 includes components to be nailed to a round, square, or other shaped wooden fence post or screwed or riveted to a square, round, or other shaped metal fence post.

Figure 1:
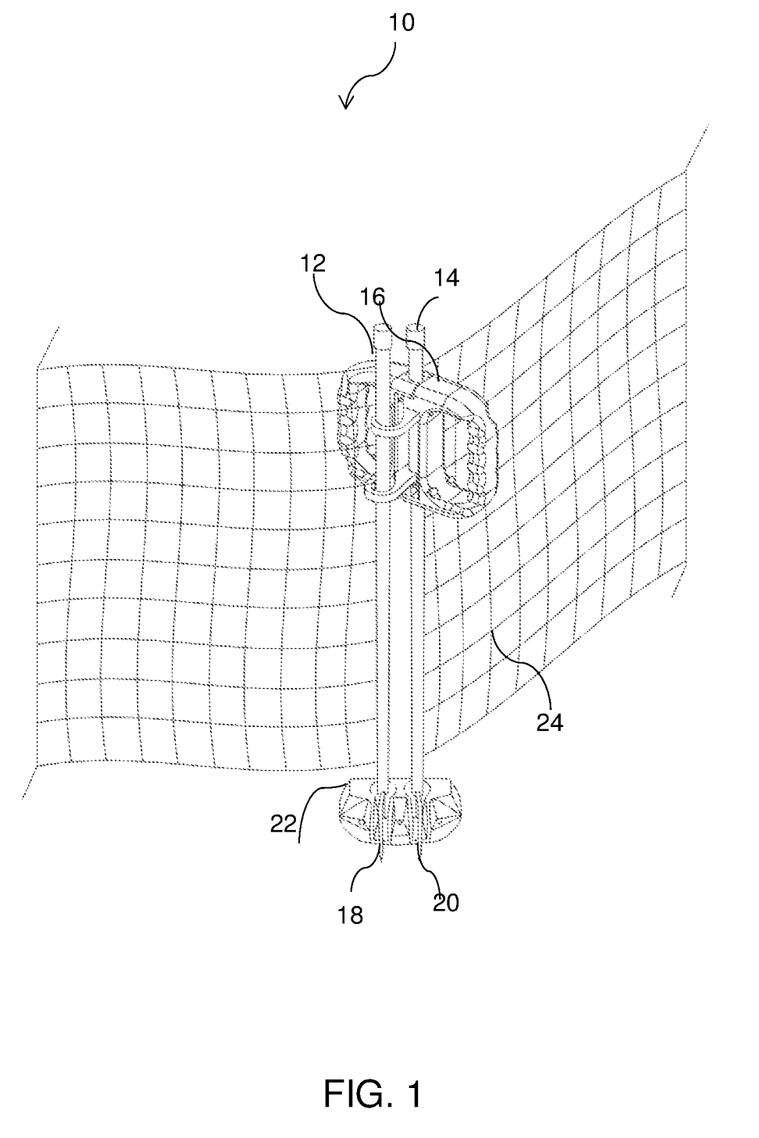
FIGS. 1-2 are perspective views of a fence opening apparatus and system installed to an electric fence, in accordance with example embodiments of the present disclosure.
Figure 2:
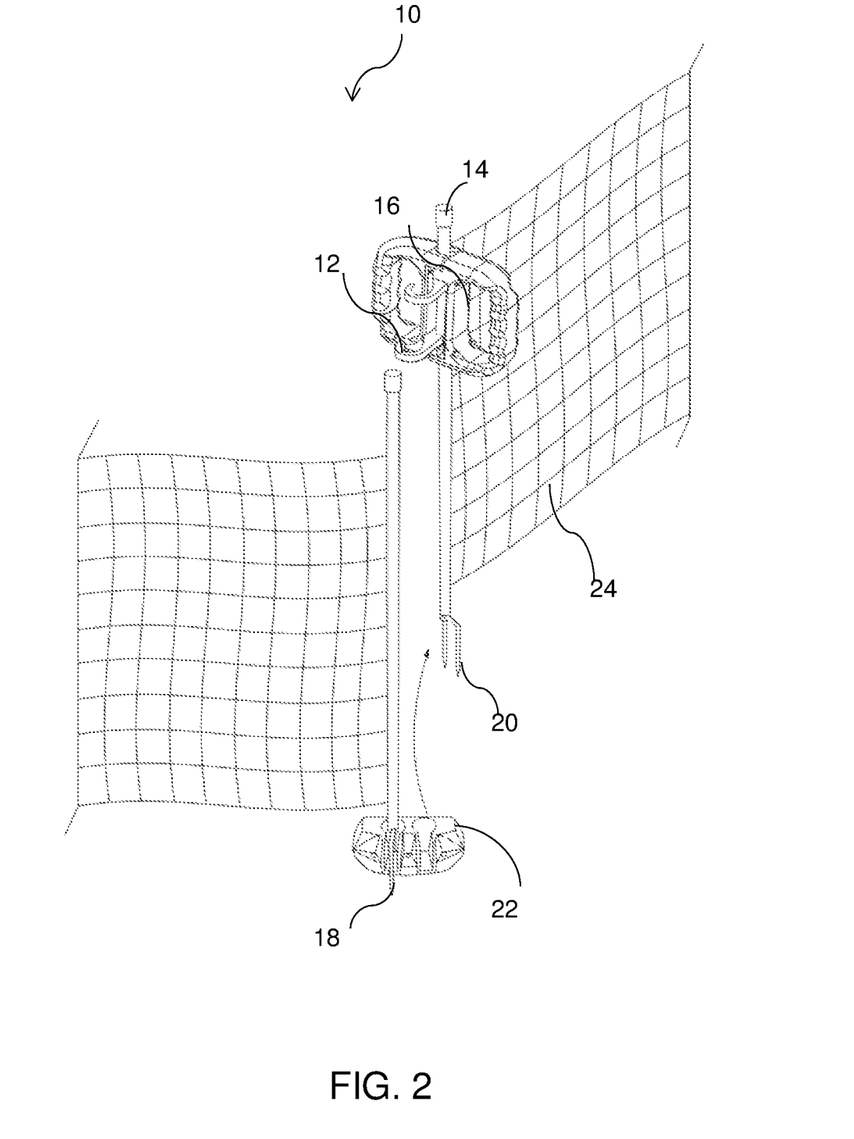

FIGS. 1-2 have been segmented for illustration purposes only, to allow the depiction of a fencing system in a single drawing. FIG. 1 illustrates the fence opening apparatus in closed position with the end posts securely connected. FIG. 2 illustrates the fence opening apparatus in open position. The fence opening apparatus includes a latch member, at least two anchor members and at least one base member.

According to an embodiment, the latch member 16 is designed to be releasably connected together between the two spaced sections of a first fence post 12 and a second fence post 14 and is positioned for maximum efficiency as to maintain the opening assembly and the fence upright. The attachment or connecting means of the latch member 16 include but are not limited to clamping, snap fitting mechanisms, turn-keys, lipped surfaces, and welding. The latch member 16 is designed to provide a controlled passage of people, vehicles and animals through the fencing system and is positioned to render it substantially impossible for water, frost, or the like to bridge the space to conduct the charge to the hand of the person grasping the handle assembly.

Figure 3:
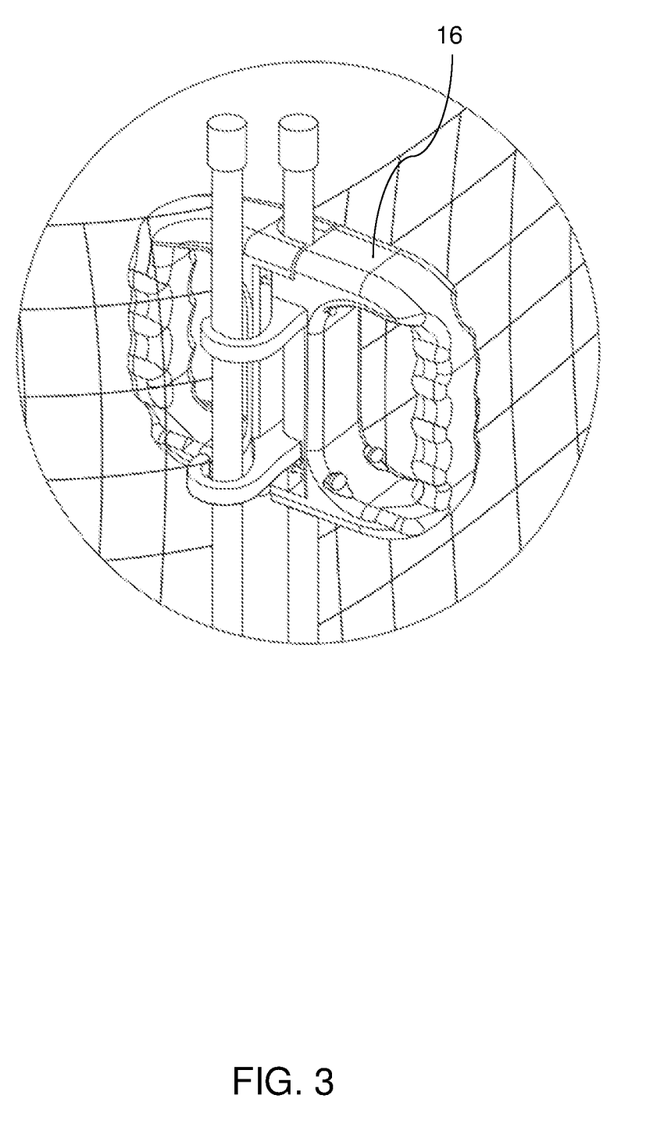
FIG. 3 is an enlarged view of a latch member of the fence opening apparatus, in accordance with example embodiments of the present disclosure.

In exemplary scenario, as illustrated in FIG. 3, the latch member 16 is configured as an interlocked handle assembly positioned at the proximal end of the one end post. The interlocked handle assembly comprises of oppositely placed separable pieces which are capable of linear movement of the fence end posts, and are superimposed on parts of the fence end posts through interlocking mating mechanisms.

In another exemplary scenario, the latch member 16 may be a fastener with plurality of holes attached on the fence end posts, wherein the plurality of holes is designed to pass a tie member e.g., a string, or a twist tie. The tie member is passed through the holes around both the fence end posts and then is knotted or tightened to secure the fence in place.

In another exemplary scenario, the latch member 16 may be a clip e.g. a mounting clip, a looped cable clip etc., that is glued or attached to the a fence end post and has a configuration which allows the clip to be securely snapped to the fence end posts and is released from the fence end posts by pressing on the release mechanism provided by the clip.

Figure 4:
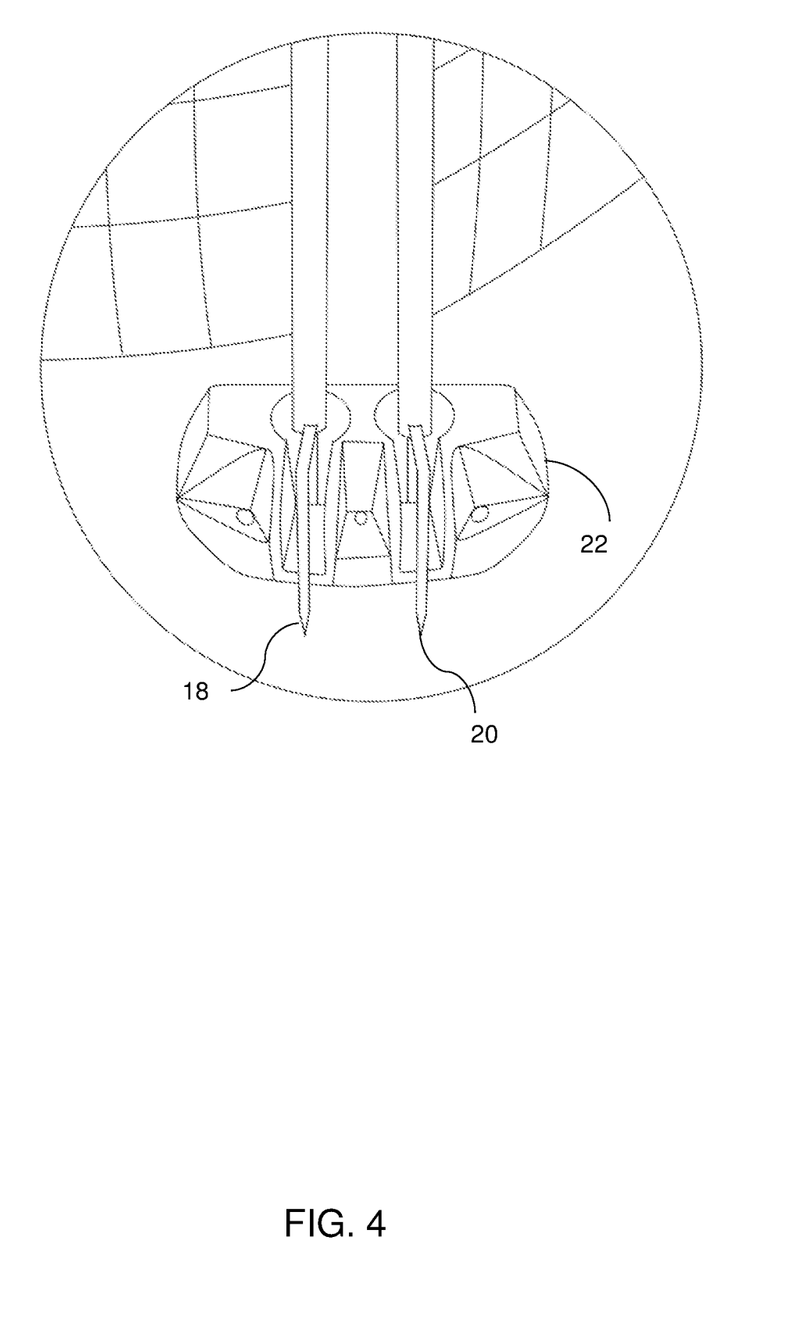
FIG. 4 is an enlarged view of a latch member of the fence opening apparatus, in accordance with example embodiments of the present disclosure.

Further, a first anchor member 18 is disposed at the end of the first fence post 12 and a second anchor member 20 is disposed at the end of a second fence post 14. Each anchor member 18,20, as shown in FIG. 4, is designed to be embedded at least partially into the ground and into the base member 22. In an exemplary scenario, each anchor member 18,20 includes two thin rods of same dimension at the end, wherein the first thin straight rod is slidably inserted into the base member 22 while the second right angled rod is inserted to the ground. The anchor members 18, 20 and the base member 22 are arranged such that the fence post 12, 14 is supported in a substantially vertical position relative to the ground.

Further, each anchor member 18, 20 is configured to raise and lower into the base member 22. The first and second fence post 12, 14 are operatively connected to the corresponding anchor member 18, 20 to disengage from the base member 22 during user manipulation creating an opening for the user to pass through the fencing system.

Further, the anchor members 18, 20 may be preferably constructed of aluminum or some other lightweight metal or metal alloy. However, it will be appreciated that the anchor members 18, 20 may also be a polymeric rod e.g. a hardened plastic or bars that are capable of being hammered or otherwise embedded at least partially into the ground and the base member.

The fencing system 10 includes a fence section 24 having the ability to be electrified using a plurality of wires and spanning the distance between the insulated end poles 12 and 14. The fence section 24, as used herein, refers to any kind of fence known in the art which may be transported to a location, such as a construction site, assembled at that location to create a perimeter fence of whatever length and shape is required to secure the location, left at the location for whatever duration is necessary/required and then disassembled and removed from the location when the fence is no longer necessary/required.

Wires, as used herein, refers to any wire which is capable of carrying an electric current. Wires include uninsulated wire, insulated wire, and grounded wire. A plurality of wires spans the distance between the insulated poles of a secondary fence section. In one embodiment, the wires span the distance horizontally between the insulated poles in a pattern alternating between uninsulated wires and grounded wires with one or more insulated live wires at an end. In still another embodiment, the wires are configured in a serpentine pattern. In yet another embodiment, the plurality of wires may be distributed in any pattern between the insulated poles which will result in an individual coming into contact with one or more of the wires during an attempt to either climb over, crawl under, or cut through a primary fence section.

The fence end posts 12, 14 are preferably fabricated from insulated materials such as, but not limited to: plastic, or similar durable and rigid materials. The proximal ends of the insulated fence end posts 12, 14 are anchored to the ground through the anchor's member 18, 20 that are operationally integrated to the base member 22. The distal ends of the fence end posts 12, 14 are configured to receive the latch member 16. The latch member 16 acts as a connector lock that is removably mounted on one fence end post to create an opening.

Further, the fence opening apparatus and system includes mechanism that allows either fence post 12, 14 to be removed from and replaced into the base member 22 by vertically lifting or replacing down the anchor member 18, 20, or, the fence post is rotated and installed within the base member or combination of both.

In use, the user grasps the latch member 16 such as handle grip that is facing the user and applies enough pressure to lift the first anchor member connected to the first end pole 14 from the base member to release the fence and create a pathway. To close the gate the user inserts the raised anchor member 20 of the first end pole 14 into the receptacle of the base member 22 and the ground, and then latches the extended mating components of the latch member 16 to the second end pole 12. The second anchor member 18 of the second end pole 12 remains in the base member 22 while the first anchor member 20 is moved between the locked and unlocked positions.

Figure 5:
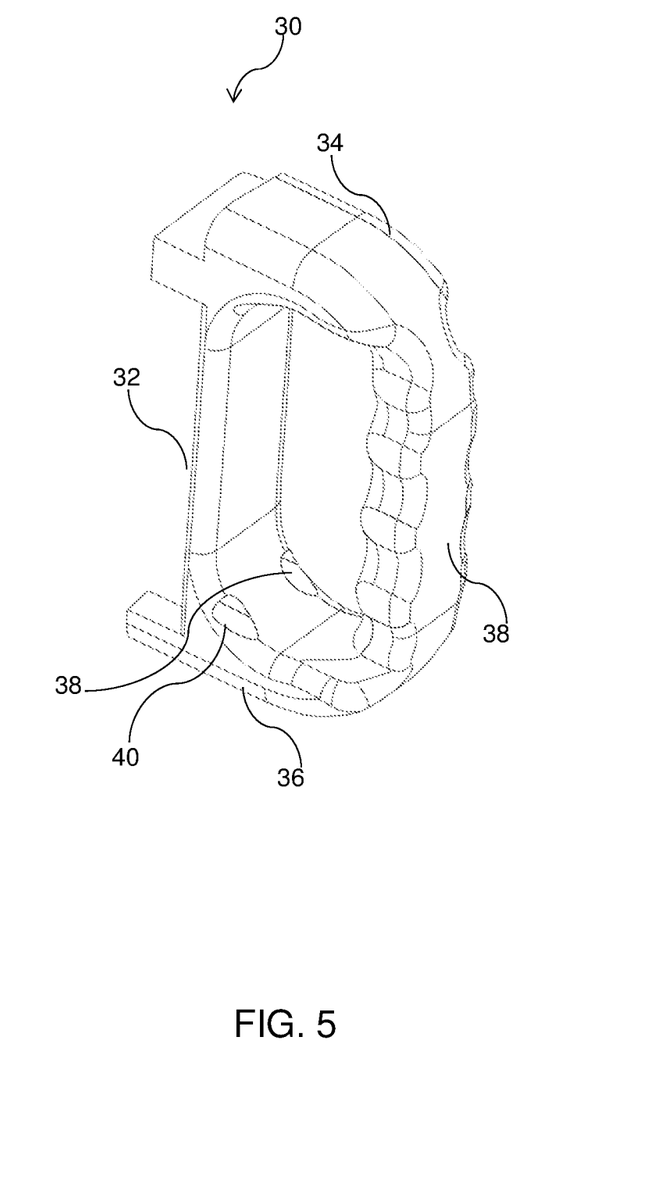
FIG. 5 is a perspective view of an independent or separate handle, in accordance with an embodiment of the present disclosure.

FIG. 5 illustrates a perspective view of an independent handle 30 which may be connected integrally to form the interlocked handle assembly of the latch member. The handle 30 is desirably a one-piece handle with a tubular casing of plastic material, such as, a medium density polyethylene.

According to an embodiment, the handle 30 includes an elongated base portion 32 extending upwardly thereon and upper and lower arm portions 34 and 36, respectively, extending inwardly from the upper and lower ends respectively, from the elongated portion to an extended handle grip portion 38. The handle arm portions 34 and 36 may extend at a slight angle or are generally perpendicular with respect to the elongated portion and include recessed portions. The handle arm portions 34 and 36 at the curved inner regions include depressions 38 and 40 (partially shown) to receive fasteners such as screws, hooks and the like to be secure the handle in place. In addition, if desired, the handle 30 can be easily removed and other handle-container engagement means can be readily provided.

Further, the handle grip portion 38 is a ribbed hand grip portion via which the casing can be grasped by the user to open or close the fence. The ribbed hand grip portion includes multiple small corrugations that may be provided by molding the handle using an injection-molding in which a corresponding small corrugation has been formed or by sandblasting or cutting a handle after molding and may be a crimp, crape, lattice or groove pattern.

In one embodiment, handle 30 is made from glow-in-the-dark plastic or painted with a glow-in-the-dark paint so that a user may readily see the door handle at night or in low light conditions. In one embodiment, a solar powered LED with a mini solar collector, may be provided on handle or in close proximity on the gatepost so that the handle is lit up when the sun goes down. Such as, a solar power source may include a voltaic solar cell or panel installed on top of the gatepost such as in a special vinyl post cap housing a pair of rechargeable batteries and battery charging circuitry. The handle 30 may also have its own mini solar collector and battery contained within the handle itself.

Figure 6:
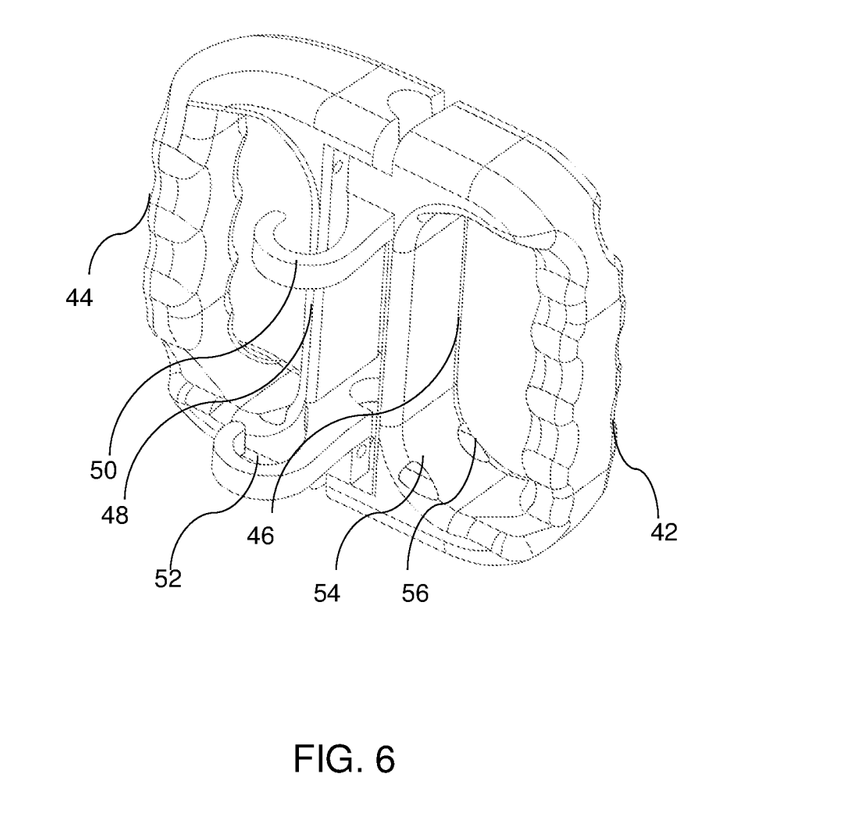
FIGS. 6-7 are perspective views of the interlocked handle assembly, in accordance with example embodiments of the present disclosure.
Figure 7:
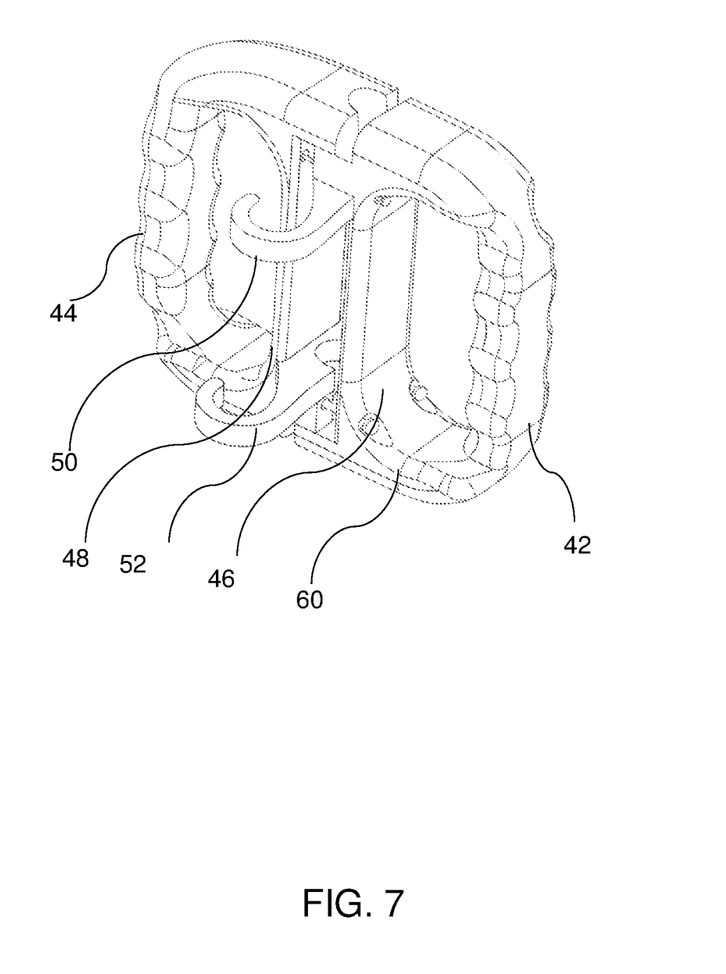

FIGS. 6-7 illustrate the perspective views of the latch member 16 configured as an interlocked handle assembly, according to the preferred embodiment. In one embodiment, a two-piece interlocked handle assembly comprises of a first piece including a handle 42 and a first interlock portion 46 and a second piece including a handle 44 and a second interlock portion 48. The two handles 42 and 44 are oppositely joined by engaging first and second elongated walls by inserting fasteners 60 such as, screws, nails and the like, in the depressions present on the inner walls of the respective handles as illustrated in FIG. 7.

The two handles 42 and 44 further include mating portions, for engagement of the interlock portions and also includes one or more mating components 50 and 52 disposed for preventing the first piece 42 and second piece 44 from becoming disengaged during operation. The interlock portion may be configured to be the point of contact of the handles and thus, also the point where force is transferred between the mating components and the handle portion.

The two separate handles 42 and 44 may be detachably locked in an interlocked state by pulling or sliding the mating components 50 and 52 between the interlocking portions 46 and 48 such that the mating components 50 and 52 cannot be pulled anymore. The mating components 50 and 52. The handle component and the mating components may appear to be substantially perpendicular or orthogonal to one another. In one embodiment, the mating components may be hooks of different/same shapes and structures.

Further, the handle component includes a first mating component 50 with its first end securely latching to the first end pole 14 and the second end extends outwards to hook-on or latch-on to the second end pole 12. Wherein the first mating component 54) is placed at the pivotal end of the handle assembly 16 and the seconding mating component 52 is placed at the distal end, with its first end slidably connected to the handle component and the second end extends outwards to hook-on or latch-on to the second end pole 12 creating a secure pathway for manipulation by the user through the electric fence by grasping the handle grip portion of the handle assembly.

It is preferred that the extended portion or hook engaged with the end pole be firmly supported and be located close to a support, thus, eliminating the need for the user to grasp the wire in order to engage or remove the hook with respect thereto, thereby avoiding the electrical shock hazard.

Figure 8:
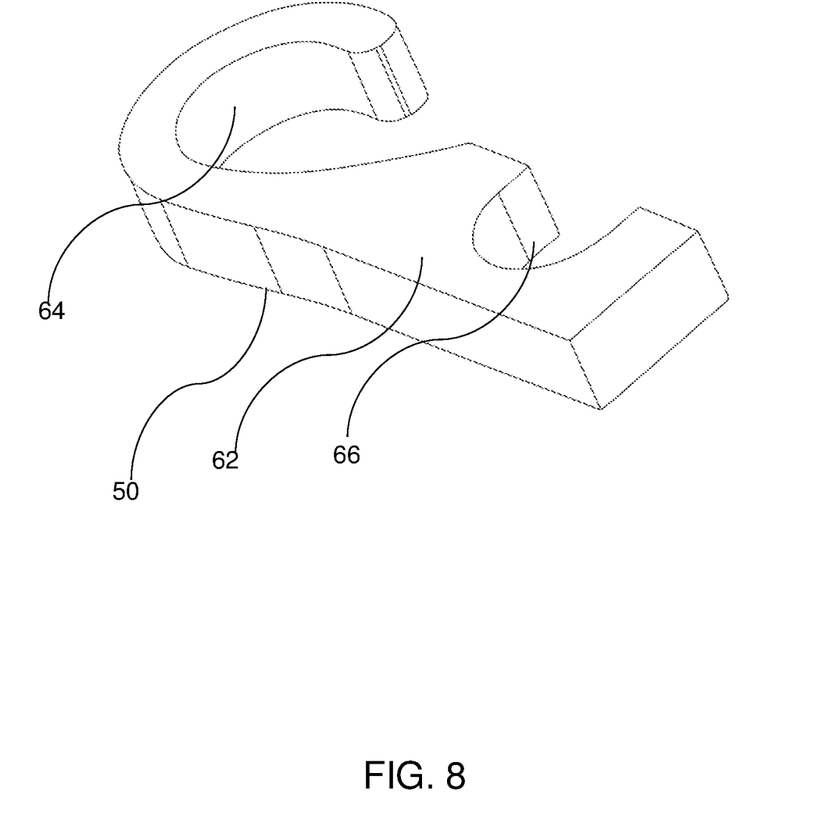
FIGS. 8-9 are perspective views of the interlocking mating components, in accordance with example embodiments of the present disclosure.
Figure 9:
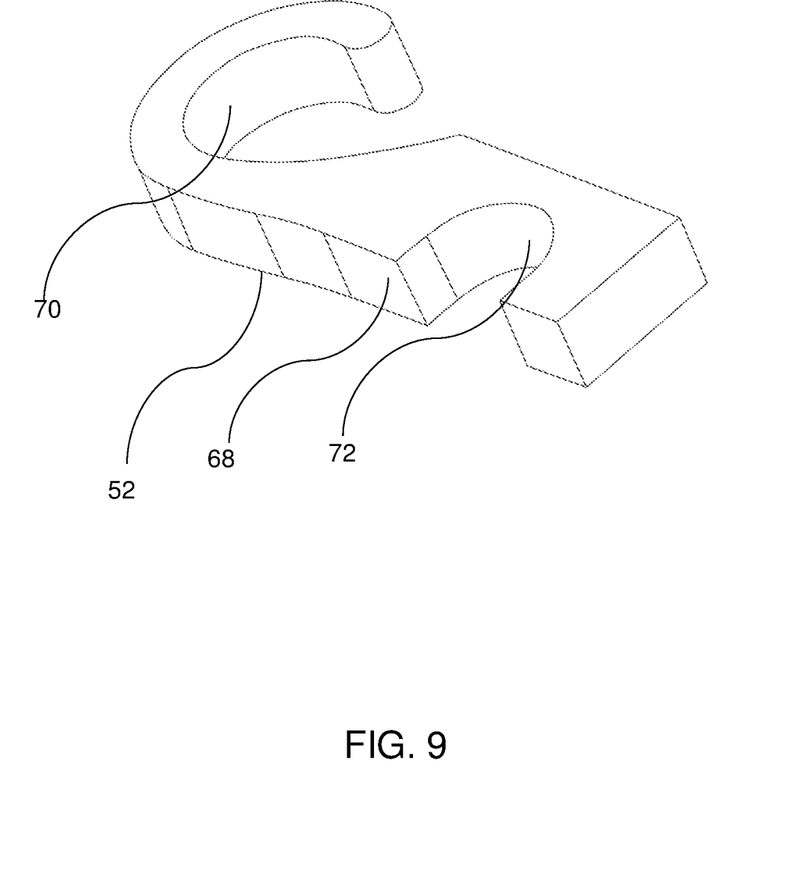

FIGS. 8-9 illustrate the perspective views of the mating components 50 and 52 in accordance to the preferred embodiments. FIG. 8 illustrates the first mating component 50 that engages with the first end pole 14 and the fence end post. According to an embodiment, the first mating component 50, is a hook that is placed at the proximal end of the handle assembly.

The book 50 includes a body portion 62 with a rounded edge 64 and a "U" shaped cut-out portion 66 designed to be pulled or slid through the handle component, until held in place by the handle component. The rounded edge 64 and the cut-out portion 66 are angularly directed in the same direction, such that the cut-out portion 66 extends outwards to securely latch or hook-on to the second end pole. The function of the body portion 62 is to allow the mating portion to be inserted into and slid through the cut-out portion 66 such that the interlock portion functions to contact the cut-out portion 66 and may act as a force transferring conduit within the handle assembly.

FIG. 9 illustrates the second mating component 52 that engages with the handle component and the fence end post. According to an embodiment, the second mating component 52 is a hook that is placed at the distal end of the latch member 16. The hook 52 includes a body portion 68 with a rounded edge 70 and a "U" shaped cut-out portion 72 designed to be pulled or slid through the handle component, until held in place by the handle component. The rounded edge and the cut-out portion 72 are angularly directed in the opposite direction such that the cut-out portion 72 extends outwards to securely latch or hook-on to the second end pole. The extended region is "U" shaped and loops around the second end pole 12. The function of the body portion 68 is to allow the mating portion to be inserted into and slid through the cut-out portions such that the interlock portion functions to contact the cut-out portion 72 and may act as a force transferring conduit.

In an exemplary scenario, the interlock portion of the handle component may be a "male" component and may be configured to slidably receive its "female" component counterpart, namely, the cut-out portion of the mating components.

While different portions of the mating component have been described in this embodiment to have different structure and different functionality, the mating components may be constructed out of one material, and if desired, as one piece. However, dividing the mating components into several, attachable parts and using more than one material, such as utilizing a metal alloy for the body portion and a rubber compound for the edges is still within the scope of the invention. In one embodiment, the body portion and the edges may both be made of a plastic material or any other suitable material. All materials discussed herein are examples and may be mixed and matched.

Figure 10:
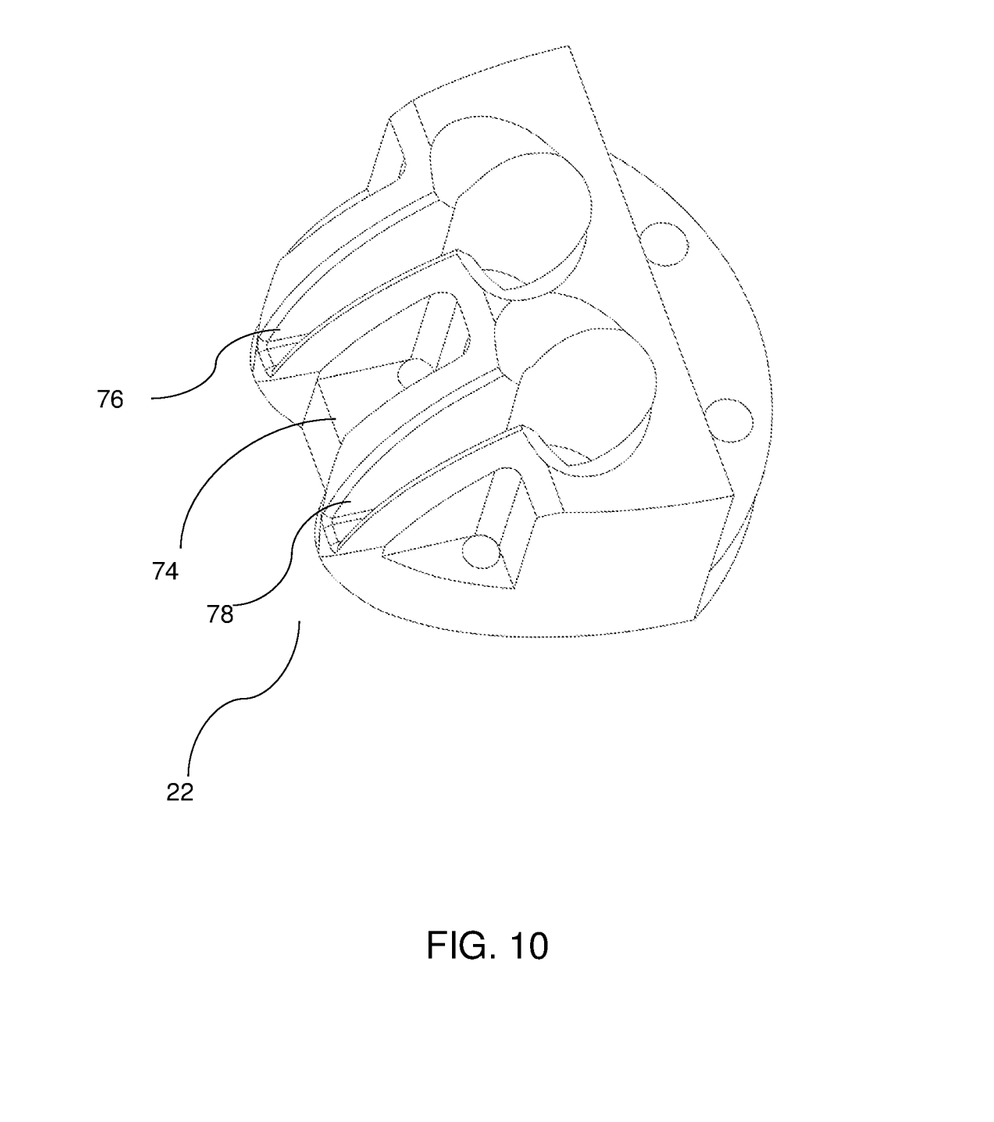
FIG. 10 is a perspective view of the base member, in accordance with example embodiments of the present disclosure.

FIG. 10 illustrates the perspective view of the base member 22 of the preferred embodiment. FIG. 10 illustrates the base member 22 with recessed regions adjacent to each other. The base member 22 comprises of a rear surface panel 74 that includes two recessed portions 76 and 78 for engaging with the respective anchor members 18, 20 of the end poles 12 and 14 of the fence. The recessed portions 76 and 78 have an inner, substantially rectangular slotted section and an inwardly angled section. The angled section opens proximate to the lower edge to slidably receive the anchor members 18, 20 herein. Panels are formed on either side of recessed portion and an elbow is formed at the junction of recessed sections.

In use, the first anchor member of the first end pole 14 is inserted downwards into the recessed portion 78 of the base member 22 to retain the fence in the closed state and the first anchor member is lifted out from the recessed portion to release the fence. The second anchor member remains within the recessed portion 76 of the base member while the first anchor member is moved between the locked and unlocked positions.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A fence opening installation system for connecting a pair of spaced fence posts, comprising:
   a latch member;
   at least two anchor members comprising a first anchor member and a second anchor member; and
   at least one base member;
   wherein the latch member is releasably connected together between two spaced sections of a first fence post and a second fence post;
   wherein the first anchor member is disposed at an end of the first fence post and the second anchor member is disposed at an end of the second fence post;
   wherein the first and second fence posts are operatively connected to the corresponding first and second anchor members to disengage from the at least one base member to raise out a corresponding post lower section of one fence post in conjunction with a user manipulation to create an opening for the user;
   wherein the latch member comprises a first piece and a second piece, the first piece comprising a first handle and a first interlock portion, the second piece comprising a second handle and a second interlock portion; and
   wherein the first handle and the second handle are detachably locked in an interlocked state by sliding a mating component between the first interlock portion and the second interlock portion, the mating component latches to the first fence post at one end and to the second fence post at the other end.

2. The system of claim 1, wherein the latch member is configured as an interlocked handle assembly positioned at the proximal end at least one fence post.

3. The system of claim 2, wherein the interlocked handle assembly comprises an oppositely placed separable handles which are capable of linear movement to a fence post, and are superimposed on parts of the fence post through interlocking mating mechanisms.

4. The system of claim 1, wherein the latch member is designed to provide a controlled passage of people, vehicles and animals through a fencing system.

5. The system of claim 1, wherein each anchor member is designed to be embedded at least partially into the ground and into the at least one base member.

6. The system of claim 1, wherein each anchor member further comprises of two rods of same dimension at the end, wherein the two rods comprise a first straight rod and second right angled rod, and wherein the first straight rod is slidably inserted into the base member while the second right angled rod is inserted to the ground.

7. The system of claim 1, wherein proximal ends of the first and second fence posts are anchored to the ground by the first and second anchor members integrated to the at least one base member.

8. The system of claim 1, wherein distal ends of the first and second fence posts are configured to receive the latch member.

9. The system of claim 1, wherein the latch member acts as a connector lock that is removably mounted on one fence post to create the opening.

10. The system of claim 1, wherein during operation the second anchor member remains in the at least one base member while the first anchor member is moved between locked and unlocked positions.

* * * * *